United States Patent [19]
Casci et al.

[11] Patent Number: 5,102,641
[45] Date of Patent: Apr. 7, 1992

[54] ZEOLITE NU-87

[75] Inventors: John L. Casci; Allan Stewart, both of Cleveland, England

[73] Assignee: Imperial Chemical Industries PLC, London, England

[21] Appl. No.: 453,318

[22] Filed: Dec. 22, 1989

[30] Foreign Application Priority Data

Dec. 22, 1988 [GB] United Kingdom ............... 8829924

[51] Int. Cl.$^5$ .................................. C01B 33/34
[52] U.S. Cl. ..................... 423/328; 502/77; 210/660; 210/679; 210/680; 585/820; 585/823
[58] Field of Search ............ 423/326, 328, 329, 330; 502/64, 60, 77; 210/660, 679, 680; 585/820, 823

[56] References Cited

U.S. PATENT DOCUMENTS

| | | | |
|---|---|---|---|
| 4,076,842 | 2/1978 | Plank et al. | 423/329 |
| 4,490,342 | 12/1984 | Valyocsik | 423/328 |
| 4,528,171 | 7/1985 | Casci et al. | 423/328 |
| 4,531,012 | 7/1985 | Valyocsik | 428/328 |
| 4,537,754 | 8/1985 | Casci et al. | 423/328 |
| 4,578,259 | 3/1986 | Morimoto et al. | 423/328 |
| 4,619,820 | 10/1986 | Valyocsik | 423/328 |
| 4,657,750 | 4/1987 | Takatsu et al. | 423/328 |
| 4,705,674 | 11/1987 | Araya et al. | 423/328 |

FOREIGN PATENT DOCUMENTS 042226 12/1981 European Pat. Off. .
125078 11/1984 European Pat. Off. .
2202838 10/1988 United Kingdom ............... 423/328

OTHER PUBLICATIONS

Barrer, R. M., "Hydrothermal Chemistry of Zeolites", Academic Press, 1982, pp. 137-140.
Parker et al., "Synthesis and Some Properties of Two Novel Zeolites, KZ-1 and KZ-2", Zeolites, vol. 3 (1983), pp. 8-11.
Lok et al., "The Role of Organic Molecules in Molecular Sieve Synthesis", vol. 3, (1983), Zeolites, pp. 282-291.
New Developments in Zeolite Science and Technology, Studies in Surface Science and Catalysis 28, Proceedings of the 7th International Zeolite Conference, Tokyo, Japan, Aug. 17-22, 1986, Kodansha, Ltd., pp. 215-222, J. L. Casci, "Bis-Quaternary Ammonium Compounds as Templates in the Crystallisation of Zeolites and Silica Molecular Sieves".

Primary Examiner—R. Bruce Breneman
Attorney, Agent, or Firm—Cushman, Darby & Cushman

[57] ABSTRACT

A novel zeolite, NU-87 has in its "as-prepared" form an X-ray diffraction pattern including the lines given in Table 1. It is prepared from a reaction mixture containing sources of silica, a polymethylene alpha, omega-diammonium cation and optionally sources of alumina and metal oxide.

15 Claims, 4 Drawing Sheets

ZEOLITE NU-87

The present invention relates to a novel zeolite hereinafter referred to as zeolite NU-87 and to a method of making it.

According to the present invention we provide a zeolite, referred to hereinafter as NU-87, having a chemical composition expressed on an anhydrous basis, in terms of the mole ratios of oxides, by the formula:

100XO$_2$: equal to or less than 10 Y$_2$O$_3$: equal to or less than 20 R$_{2/n}$O where R is one or more cations of valency n, X is silicon and/or germanium, Y is one or more of aluminium, iron, gallium, boron, titanium, vanadium, zirconium, molybdenum, arsenic, antimony, chromium and manganese and having, in its as-prepared form, an X-ray diffraction pattern including the lines shown in Table 1.

The invention also provides zeolite NU-87 in its hydrogen form, designated H-NU-87, produced by calcination and/or ion exchange as described herein. Zeolite H-NU-87 has an X-ray diffraction pattern including the lines shown in Table 2.

TABLE 1

Zeolite NU-87 as-prepared

| d (Angstroms) | Relative Intensity[d] |
|---|---|
| 12.52 ± 0.15 | w |
| 11.06 ± 0.15 | s |
| 10.50 ± 0.15 | m |
| 8.31 ± 0.15 | w |
| 6.81 ± 0.12 | w |
| 4.62 ± 0.10 | m-s |
| (a) 4.39 (Sh) ± 0.10 | m-s |
| 4.31 ± 0.10 | vs |
| 4.16 ± 0.10 | m |
| 3.98 ± 0.08 | s-vs |
| (b) 3.92 (Sh) ± 0.08 | s |
| 3.83 ± 0.08 | w-m |
| 3.70 ± 0.07 | m-s |
| 3.61 ± 0.07 | w |
| 3.41 ± 0.07 | m-s |
| (c) 3.37 (Sh) ± 0.07 | m |
| 3.26 ± 0.06 | s-vs |
| 3.15 ± 0.06 | w |
| 3.08 ± 0.06 | w |
| 2.89 ± 0.05 | w-m |
| 2.52 ± 0.04 | w-m |

(Sh) denotes that the peak occurs as a shoulder on a more intense peak
(a) occurs on the low angle side of the peak at about 4.31A
(b) occurs on the high angle side of the peak at about 3.98A
(c) occurs on the high angle side of the peak at about 3.41A
[d] Based on a relative intensity scale in which the strongest line in the X-ray pattern is assigned a value of 100:
weak (w) is less than 20
medium (m) is between 20 and 40
strong (s) is greater than 40 but less than 60
very strong (vs) is greater than 60.

TABLE 2

ZEOLITE NU-87 IN ITS HYDROGEN FORM, H-NU-87

| d (Angstroms) | Relative Intensity[d] |
|---|---|
| 12.44 ± 0.15 | w |
| 11.12 ± 0.15 | vs |
| 10.52 ± 0.15 | m-s |
| 8.33 ± 0.15 | w |
| 6.81 ± 0.12 | w-m |
| 4.60 ± 0.10 | s-vs |
| (a) 4.39 (Sh) ± 0.10 | m-s |
| 4.32 ± 0.10 | vs |
| 4.17 ± 0.10 | m |
| 3.98 ± 0.08 | vs |
| (b) 3.91 (Sh) ± 0.08 | s |
| 3.84 ± 0.08 | w |
| 3.73 ± 0.07 | m-s |
| 3.60 ± 0.07 | w |
| 3.41 ± 0.07 | s |
| (c) 3.37 (Sh) 3.34 } doublet ± 0.07 | m-s |
| 3.26 ± 0.06 | vs |
| 3.16 ± 0.06 | w-m |
| 3.08 ± 0.06 | w-m |
| 2.90 ± 0.05 | w-m |
| 2.51 ± 0.04 | m |

(Sh) denotes that the peak occurs as a shoulder on a more intense peak
(a) occurs on the low angle side of the peak at about 4.32A
(b) occurs on the high angle side of the peak at about 3.98A
(c) occurs on the high angle side of the peak at about 3.41A
[d] Based on a relative intensity scale in which the strongest line in the X-ray pattern is assigned a value of 100:
weak (w) is less than 20
medium (m) is between 20 and 40
strong (s) is greater than 40 but less than 60
very strong (vs) is greater than 60.

In the diffractograms from which X-ray data are obtained some, or all, of the shoulders and doublets shown in Tables 1 and 2 may not be resolved from the stronger peaks with which they are associated. This may occur for poorly crystalline samples or in samples in which the crystals are sufficiently small to result in significant X-ray broadening. It may also occur if the equipment, or conditions, used to obtain the pattern differ from those used herein.

The X-ray powder diffraction data provided herein were obtained with a Philips APD 1700 automated X-ray diffraction system using Cu K-alpha radiation from a long fine focus X-ray tube operating at 40 KV and 50 mA. The radiation was monochromatised by a curved graphite crystal adjacent to the detector. An automatic theta-compensating divergence slit was used with a 0.1 mm receiving slit. Step scanned data were collected between 1 and 60 degrees two-theta. The collected data were analysed in a DEC (Digital Equipment Corporation) Micro PDP -11/73 computer with Philips PW 1867/87 version 3.0 software.

It is believed that NU-87 has a new framework structure or topology which is characterised by its X-ray diffraction pattern. NU-87 in its as-prepared and hydrogen forms has substantially the X-ray data given in Tables 1 and 2 respectively and is thereby distinguished from known zeolites. In particular it is distinguished from zeolite EU-1, as described in European Patent 42226, since the X-ray diffraction pattern for EU-1 does not contain an X-ray line at about 12.5A. Furthermore, the X-ray diffraction pattern for EU-1 contains an X-ray line at about 10.1A which line is absent from the X-ray diffraction pattern of NU-87.

Within the above definition of chemical composition the number of moles of Y$_2$O$_3$ per 100 moles of XO$_2$ is typically in the range 0.1 to 10 for example 0.2 to 7.5 and zeolite NU-87 appears to be most readily formed in a state of high purity when the number of moles of Y$_2$O$_3$ per 100 moles of XO$_2$ is in the range 0.4 to 5.

This definition includes as-prepared NU-87 and also forms of it resulting from dehydration and/or calcination and/or ion exchange. The expression "as-prepared" means the product of synthesis and washing with or without drying or dehydration. In its as-prepared form NU-87 may include M, an alkali-metal cation, especially sodium and/or ammonium and, when prepared for example from alkylated nitrogen compounds, may include nitrogen-containing organic cations as described below or degradation products thereof or precursors thereof. Such nitrogen-containing organic cations are hereinafter referred to as Q. Thus zeolite NU-87, as prepared, has the following molar composition, expressed on an anhydrous basis: 100 $XO_2$: less balance for all other sorbates. Samples were outgassed at 300 C., overnight, before measurements were made. Results are presented as % (w/w) uptake at relative pressures (P/Po), where Po is the saturated vapour pressure. The figures for apparent voidage filled were calculated assuming that the liquids maintain their normal densities at the sorption temperature.

TABLE 3

Sorption data for H-NU-87

| Sorbate | Adsorption Temperature [°C.] | Relative Pressure | Uptake [% (w/w)] | Apparent Voidage[1] filled [$cm^3 g^{-1}$] | Kinetic Diameter[2] nm |
|---|---|---|---|---|---|
| Water | 25.4 | 0.07 | 5.4 | 0.054 | 0.265 |
|  |  | 0.28 | 8.3 | 0.083 |  |
|  |  | 0.46 | 10.0 | 0.100 |  |
| Methanol | 25.2 | 0.10 | 10.3 | 0.130 | 0.380 |
|  |  | 0.29 | 11.6 | 0.147 |  |
|  |  | 0.50 | 12.3 | 0.156 |  |
| n-Hexane | 26.7 | 0.13 | 11.0 | 0.167 | 0.430 |
|  |  | 0.31 | 11.5 | 0.175 |  |
|  |  | 0.52 | 12.0 | 0.182 |  |
| Toluene | 26.7 | 0.11 | 12.3 | 0.142 | 0.585 |
|  |  | 0.32 | 13.2 | 0.152 |  |
|  |  | 0.48 | 13.6 | 0.157 |  |
| Cyclohexane | 26.7 | 0.12 | 11.6 | 0.149 | 0.600 |
|  |  | 0.37 | 12.2 | 0.157 |  |
|  |  | 0.49 | 12.5 | 0.160 |  |
| Neopentane (2,2-dimethyl propane) | 0.0 | 0.11 | 3.29 | 0.05 | 0.620 |
|  |  | 0.32 | 5.55 | 0.09 |  |
|  |  | 0.54 | 8.54 | 0.14 |  |

[1]The apparent voidage filled was calculated assuming the liquids maintain their normal densities at the adsorption temperature
[2]Kinetic diameters are taken from "Zeolite Molecular Sieves", D W Breck, J Wiley and Sons, 1976 p 636. The value for methanol was assumed to be the same as for methane, n-hexane the same as n-butane and toluene the same as benzene.
[3]The uptake is grams of sorbate per 100 grams of anhydrous zeolite.

than or equal to 10 $Y_2O_3$: less than or equal to 10 Q: less than or equal to 10 $M_2O$ where Q is the nitrogen-containing organic cation referred to above and M is the alkali metal and/or ammonium cation.

The compositions for NU-87 above are given on an anhydrous basis, although as-prepared NU-87 and activated forms of NU-87 resulting from calcination and/or ion exchange may contain water. The molar $H_2O$ content of such forms, including as-prepared NU-87, depends on the conditions under which it has been dried and stored after synthesis or activation. The range of molar quantitities of contained water is typically between 0 and 100 per 100 $XO_2$.

Calcined forms of zeolite NU-87 include no nitrogen-containing organic compound or less than the as-prepared form, since the organic material is burned out in the presence of air, leaving hydrogen ion as the other cation.

Among the ion-exchanged forms of zeolite NU-87 the ammonium ($NH_4^+$) form is of importance since it can be readily converted to the hydrogen form by calcination. The hydrogen form and forms containing metals introduced by ion exchange are described below. Under some circumstances exposure of the zeolite of the invention to acid can result in partial or complete removal of a framework element such as aluminum as well as the generation of the hydrogen form. This can provide a means of altering the composition of the zeolite material after it has been synthesised.

Zeolite NU-87 may also be characterised by its sorptive capacity for molecules of various sizes. Table 3 contains sorption results which were obtained on the hydrogen form of zeolite NU-87, the product from example 6.

The data were obtained using a McBain-Bakr spring balance for water and methanol and a CI Robal Micro- The kinetic diameters given in the extreme right hand column of Table 3 were taken from "Zeolite Molecular Sieves" D W Breck, J Wiley and Sons, 1976 (p636), with the value for methanol assumed to be the same as for methane, the value for n-hexane to be the same as for n-butane and for value for toluene to be the same as for benzene.

The results show that NU-87 has significant capacity for various sorbates at low relative pressures. The low uptake for water, compared with methanol, n-hexane, toluene and cyclohexane, indicates that NU-87 has significant hydrophobic character which means that this material may be useful for separating traces of organic materials from solutions comprising water and organic materials. The results in Table 3 indicate that zeolite NU-87 shows a molecular sieving effect with respect to neopentane since much lower uptakes were observed compared with the other hydrocarbon sorbates at similar relative pressures. In addition the time required to reach equilibrium was much longer than for the other hydrocarbon sorbates. These results indicate that NU-87 has a window size close to 0.62 nanometers.

The invention also provides a method for the preparation of zeolite NU-87 which comprises reacting an aqueous mixture comprising a source of at least one oxide $XO_2$, optionally a source of at least one oxide $Y_2O_3$, optionally a source of at least one oxide $M_2O$ and at least one nitrogen-containing organic cation Q, or precursors thereof, the mixture preferably having the molar composition:

$XO_2/Y_2O_3$ at least 10, more preferably 10 to 500, most preferably 20 to 200

$(R_{1/n})OH/XO_2$ is 0.01 to 2, more preferably 0.05 to 1, most preferably 0.10 to 0.50

H₂O/XO₂ is 1 to 500, more preferably 5 to 250, most preferably 25 to 75

Q/XO₂ is 0.005 to 1, more preferably 0.02 to 1, most preferably 0.05 to 0.5

$L_pZ/XO_2$ is 0 to 5, more preferably 0 to 1, most preferably 0 to 0.25 where X is silicon and/or germanium, Y is one or more of aluminium, iron, boron, titanium, vanadium, zirconium, molybdenum, arsenic, antimony, gallium, chromium, manganese, R is a cation of valency n which can include M, (an alkali metal cation and/or ammonium), and/or Q, (a nitrogen-containing organic cation, or a precursor thereof). In some circumstances it may be an advantage to add a salt $L_pZ$ where Z is an anion of valency p and L is an alkali metal or ammonium ion which may be the same as M or a mixture of M and another alkali metal or an ammonium ion necessary to balance the anion Z. Z may comprise an acid radical added for example as a salt of L or as a salt of aluminium. Examples of Z may include strong acid radicals such as bromide, chloride, iodide, sulphate, phosphate or nitrate or weak acid radicals such as organic acid radicals, for example citrate or acetate. While $L_pZ$ is not essential, it may accelerate the crystallisation of zeolite NU-87 from the reaction mixture and may also affect the crystal size and shape of NU-87. The reaction is continued until it contains a major proportion i.e. at least 50.5% of zeolite NU-87.

Many zeolites have been prepared using nitrogen-containing organic cations or degradation products thereof or precursors thereof and in particular, polymethylene alpha omega-diammonium cations having the formula:

$$[(R_1R_2R_3)N(CH_2)_mN(R_4R_5R_6)]^{2+}$$

where $R_1$ to $R_6$, which may be the same or different, can be hydrogen, alkyl or hydroxyalkyl groups containing from 1 to 8 carbon atoms, and up to five of the groups can be hydrogen, and m is in the range 3 to 14. For example zeolite EU-1 (EP 42226), zeolite EU-2 (GB 2 077 709) and zeolite ZSM-23 (EP 125 078, GB 2 202 838) have been prepared using such templates. The use of these templates in the preparation of zeolites and molecular sieves has also been described in the PhD thesis of J L Casci entitled "The Use of Organic Cations in Zeolite Synthesis" (1982) The University of Edinburgh, and in the following papers: G W Dodwell, R P Denkewicz and L B Sand "Zeolites", 1985, vol 5, page 153 and J L Casci Proc. VII Int. Zeolite Conf., Elsevier, 1986, page 215.

In the method according to the present invention Q is preferably a polymethylene alpha, omega-diammonium cation having the formula:

$$[(R_1R_2R_3)N(CH_2)_mN(R_4R_5R_6)]^{2+}$$

or an amine degradation product thereof, or a precursor thereof where $R_1$, $R_2$, $R_3$, $R_4$, $R_5$ and $R_6$ may be the same or different and are $C_1$ to $C_3$ alkyl and m is in the range of 7 to 14.

Q is more preferably $$[(CH_3)_3N(CH_2)_mN(CH_3)_3]^{2+}$$

where m is in the range 8 to 12, and is most preferably $$[(CH_3)_3N(CH_2)_{10}N(CH_3)_3]^{2+}$$

M and/or Q can be added as hydroxides or salts of inorganic acids provided the $(R_{1/n})OH/XO_2$ ratio is fulfilled.

Suitable precursors of the nitrogen-containing organic cation Q include the parent diamine with a suitable alkyl halide or the parent dihaloalkane with a suitable trialkylamine. Such materials can be used as simple mixtures or they can be pre-heated together in the reaction vessel, preferably in solution, prior to the addition of the other reactants required for the synthesis of zeolite NU-87.

The preferred cation M is an alkali metal especially sodium, the preferred XO₂ is silica (SiO₂) and the preferred oxide Y₂O₃ is alumina (Al₂O₃).

The silica source can be any of those commonly considered for use in synthesising zeolites, for example powdered solid silica, silicic acid, colloidal silica or dissolved silica. Among the powdered silicas usable are precipitated silicas, especially those made by precipitation from an alkali metal silicate solution, such as the type known as "KS 300" made by AKZO, and similar products, aerosil silicas, fumed silicas e.g. "CAB-O-SIL" and silica gels suitably in grades for use in reinforcing pigments for rubber and silicone rubber. Colloidal silicas of various particle sizes may be used, for example 10-15 or 40-50 microns, as sold under the Registered Trade Marks "LUDOX", "NALCOAG" and "SYTON". The usable dissolved silicas include commercially available waterglass silicates containing 0.5 to 6.0, especially 2.0 to 4.0 mols of SiO₂ per mol of alkali metal oxide, "active" alkali metal silicates as defined in UK Patent 1193254, and silicates made by dissolving silica in alkali metal hydroxide or quaternary ammonium hydroxide or a mixture thereof.

The optional alumina source is most conveniently sodium aluminate, or aluminium, an aluminium salt, for example the chloride, nitrate or sulphate, an aluminium alkoxide or alumina itself, which should preferably be in a hydrated or hydratable form such as colloidal alumina, pseudoboehmite, boehmite, gamma alumina or the alpha or beta trihydrate. Mixtures of the above can be used.

Optionally all or some of the alumina and silica source may be added in the form of an aluminosilicate.

The reaction mixture is usually reacted under autogenous pressure, optionally with added gas, e.g. nitrogen, at a temperature between 85° C. and 250° C., preferably 120° C. and 200° C., until crystals of zeolite NU-87 form, which can be from 1 hour to many months depending on the reactant composition and the operating temperature. Agitation is optional, but is preferable since it reduces the reaction time and can improve product purity.

The use of seed material can be advantageous in decreasing the time to nucleation and/or overall crystallisation time. It may also be an advantage in encouraging the formation of NU-87 at the expense of an impurity phase. Such seed materials include zeolites, especially crystals of zeolite NU-87. The seed crystals are usually added in an amount of between 0.01 and 10% of the weight of silica used in the reaction mixture. The use of a seed is particularly desirable when the nitrogen-containing organic cation is a polymethylene alpha, omega-diammonium cation with seven, eight or nine methylene groups ie m is 7, 8 or 9.

At the end of the reaction, the solid phase is collected in a filter and washed, and is then ready for further steps such as drying, dehydration and ion exchange.

Certain preparations of zeolite NU-87 may result in products which contain NU-87 together with other species such as mordenite and analcime. Preferably the preparations lead to a product containing at least 75%, most preferably at least 95% by weight zeolite NU-87.

If the product of the reaction contains alkali metal ions, these have to be at least partly removed in order to prepare the hydrogen form of NU-87 and this can be done by ion-exchange with an acid, especially a mineral acid such as hydrochloric acid or by way of the ammonium compound, made by ion exchange with a solution of an ammonium salt such as ammonium chloride. Ion exchange may be carried out by slurrying once or several times with the ion exchange solution. The zeolite is usually calcined before ion exchange to remove any occluded organic matter since this usually facilitates ion exchange.

In general, the cation(s) of zeolite NU-87 can be replaced by any cation(s) of metals, and particularly those in groups 1A, 1B, IIA, IIB, IIIA and IIIB (including rare earths) VIII (including noble metals) other transition metals and by tin, lead and bismuth. (The Periodic Table is as in "Abridgements of Specifications" published by the UK Patent Office). Exchange is normally carried out using a solution containing a salt of the appropriate cation.

The invention is illustrated by the following Examples,

EXAMPLE 1

Preparation of NU-87

A reaction mixture of molar composition:

$60SiO_2\text{-}1.333Al_2O_3\text{-}10Na_2O\text{-}7.5DecBr_2\text{-}3500H_2O$ was prepared from:
120.2 g "SYTON" X30 (Monsanto: 30% silica sol)
6.206 g "SOAL" 235 (Kaiser Chemicals: molar composition 1.59 $Na_2O$-1.0 $Al_2O_3$-14.7 $H_2O$)
6.30 g Sodium Hydroxide (Analar)
31.4 g $DecBr_2$
541.5 g Water (deionised)
where $DecBr_2$ is Decamethonium Bromide:

$[(CH_3)_3N(CH_2)_{10}N(CH_3)_3]Br_2$.

The molar composition given above does not include sodium present in the "SYTONC"

The mixture was prepared as follows:
A—solution containing the sodium hydroxide and "SOAL" 235 in 200 g of water
B—solution containing the $DecBr_2$ in 200 g of water
C—141.5 g of water.

Solution A was added to the "SYTON" X30, with stirring, over a 30 second period. Mixing was continued for 5 minutes then solution B was added, with stirring, over a 30 second period. Finally, the remaining water, C, was added over a 30 second period. The resulting gel was mixed for a further 5 minutes before being transferred to a 1 liter stainless steel autoclave.

The mixture was reacted at 180° C., with stirring at 300 rpm using a pitched-paddle type impeller.

About 9 days into the reaction the heating and stirring were stopped for about 2.5 hours before the preparation was restarted.

After a total of 406 hours, at reaction temperature, the preparation was crash cooled to ambient and the product discharged, filtered, washed with deionised water and dried at 110° C.

Analysis for Si, Al and Na by atomic adsorption spectroscopy (AAS) gave the following molar composition:

$37.6SiO_2\text{-}1.0Al_2O_3\text{-}0.14Na_2O$.

Figure 1:
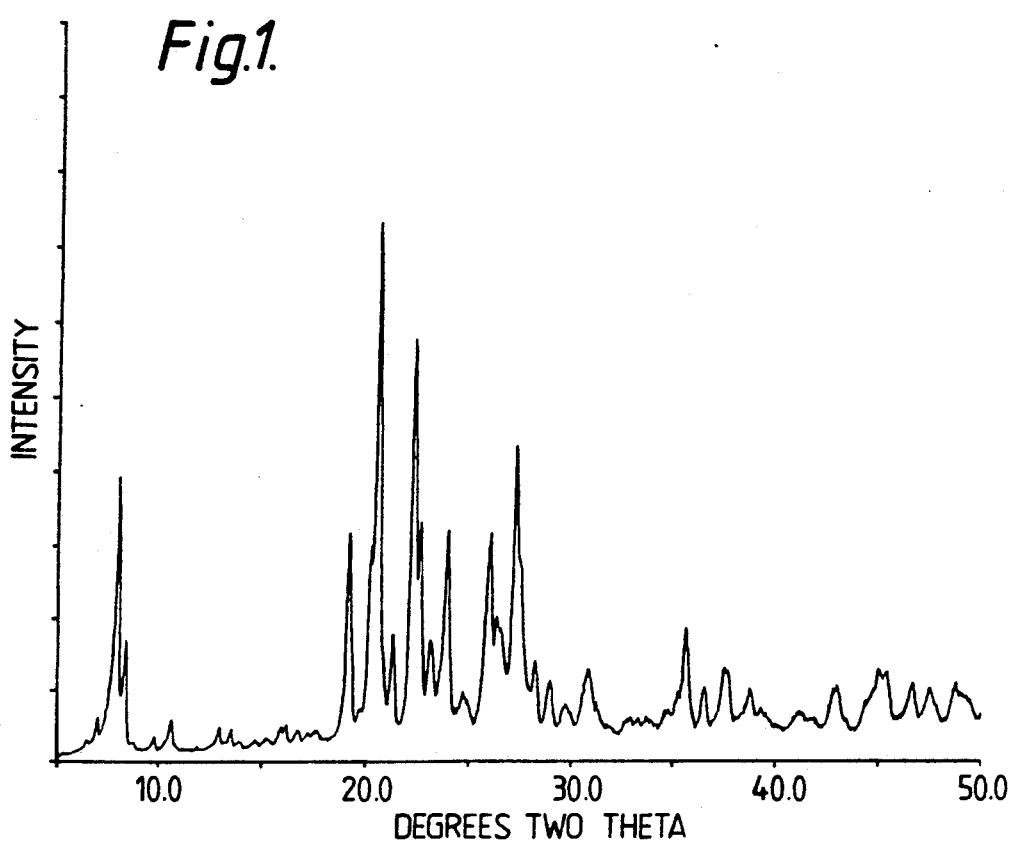
FIG. 1 is the X-ray diffraction pattern for the product of Example 1.

Analysis by X-ray powder diffraction showed this as-prepared material to be highly crystalline sample of NU-87 with the pattern shown in Table 4 and FIG. 1.

EXAMPLE 2

Preparation of hydrogen NU-87.

A portion of the material from Example 1 was calcined, in air, at 450° C. for 24 hours followed by 16 hours at 550° C. The material was then ion exchanged for 4 hours with a 1 molar solution of ammonium chloride, at room temperature, using 10 ml of solution per gram of zeolite. After two such exchanges the resulting $NH_4$-NU-87 was then calcined at 550° C. for 16 hours to generate the hydrogen form, that is, H-NU-87.

Analysis by AAS for Si, Al and Na gave the following molar composition:

$36.8SiO_2\text{-}1.0Al_2O_3$-less than $0.001Na_2O$

Figure 2:
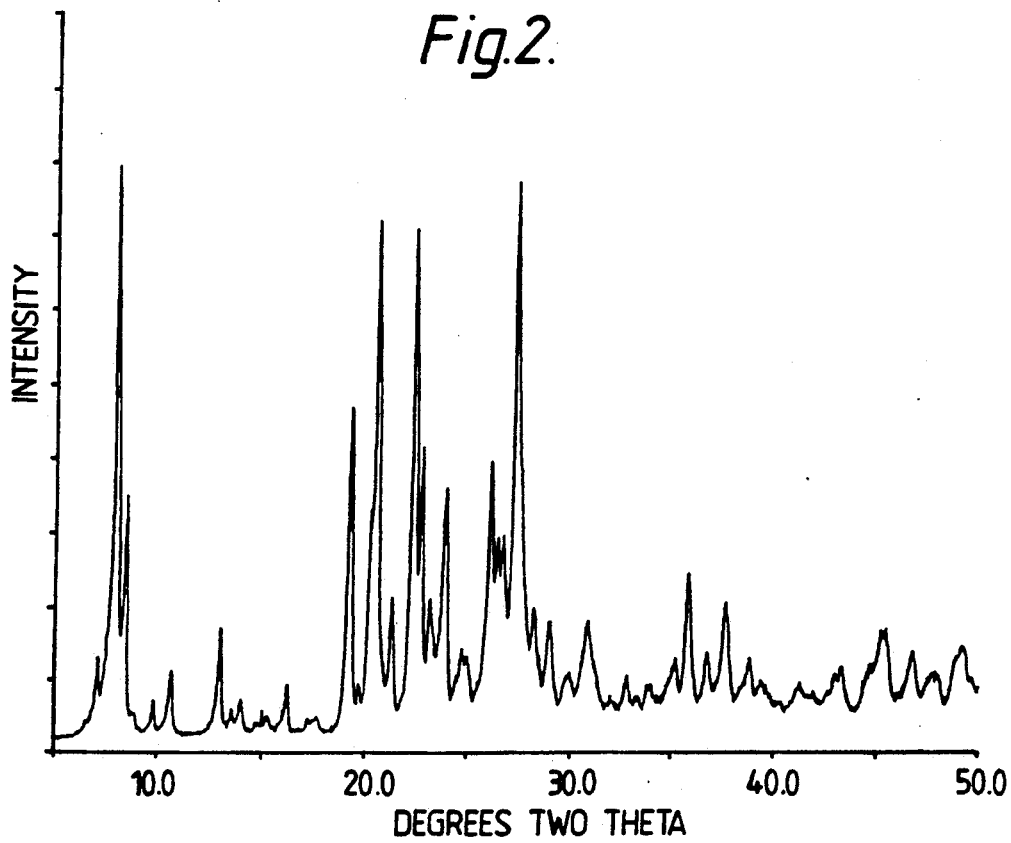
FIG. 2 is the X-ray diffraction pattern for the product of Example 2.

Analysis by powder X-ray diffraction showed the material to be a highly crystalline sample of H-NU-87. The diffraction pattern can be seen in FIG. 2 and Table 5.

EXAMPLE 3

A reaction mixture of a molar composition:

$60SiO_2\text{-}1.5Al_2O_3\text{-}10Na_2O\text{-}7.5DecBr_2\text{-}3000H_2O$ was prepared from:
36.1 g "CAB-O-SIL" (BDH Ltd)
6.982 g "SOAL" 235 (Kaiser Chemicals: molar composition 1.59 $Na_2O$-1.0 $Al_2O_3$-14.7 $H_2O$)
6.09 g Sodium Hydroxide (Analar)
31.4 g $DecBr_2$
535.2 g Water (deionised)
where $DecBr_2$ is Decamethonium Bromide:

$[(CH_3)_3N(CH_2)_{10}N(CH_3)_3]Br_2$.

The mixture was prepared by the following procedure:

The required amount of water was weighed out. About one third was used to prepare a solution (solution A) containing the sodium hydroxide and "SOAL" 235. Solution B was prepared containing the Decamethonium Bromide in about one third of the total water. The remaining water was then used to prepare a dispersion of the silica, "CAB-O-SIL."

Solutions A and B were mixed then added, with stirring, to the dispersion of the "CAB-O-SIL" in water. The resulting mixture was then reacted in a 1 liter stainless steel autoclave at 180° C. The mixture was stirred at 300 rpm using a pitched paddle type impeller.

After 258 hours at temperature the preparation was terminated, crash cooled, and discharged. The solid was separated by filtration, washed with deionised water and dried at 110° C.

Analysis for Na, Si and Al by AAS revealed the following molar composition:

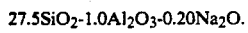
$27.5SiO_2\text{-}1.0Al_2O_3\text{-}0.20Na_2O$.

Figure 3:
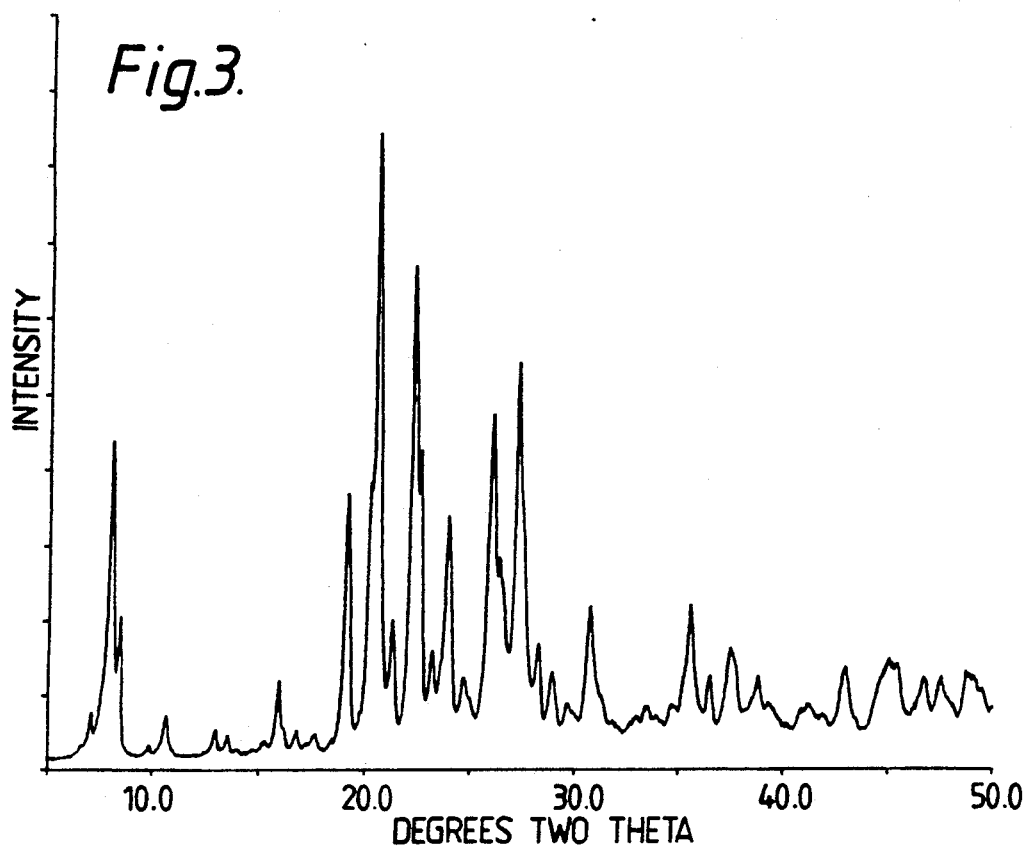
FIG. 3 is the X-ray diffraction pattern for the product of Example 3.

Analysis by X-ray powder diffraction gave the pattern shown in Table 6 and FIG. 3. The product was identified as a highly crystalline sample of NU-87 containing approximately 5% of an analcime impurity.

EXAMPLE 4

Figure 4:
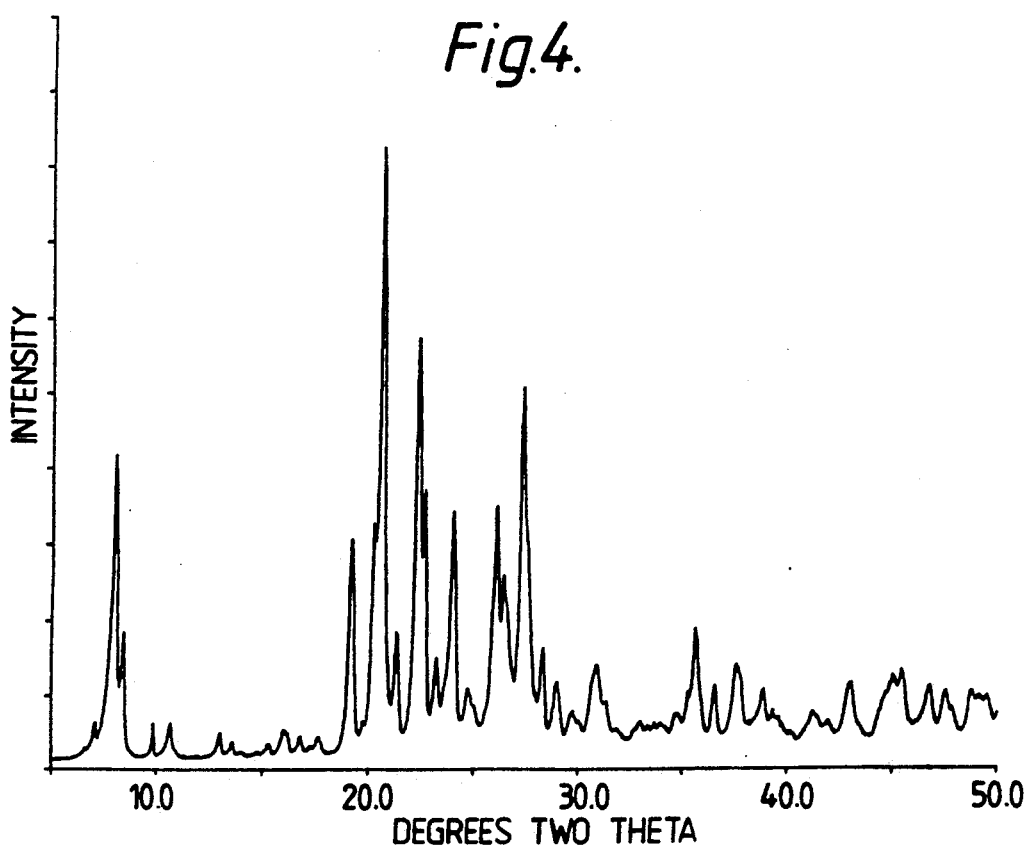
FIG. 4 is the X-ray diffraction pattern for the product of Example 4.

A portion of the product from Example 3 was treated with a molar solution of hydrochloric acid using 50 ml of acid per gram of material. The treatment was carried out at 90° C. for 18 hours after which the solid was removed by filtration, washed with deionised water and dried at 110° C. After two such treatments the product was examined by powder x-ray diffraction and found to be a highly crystalline sample of NU-87 containing no detectable amounts of analcime. The x-ray diffraction pattern can be seen in Table 7 and FIG. 4.

Analysis for Na, Si and Al by AAS revealed the following molar composition:

$41.8SiO_2\text{-}1.0Al_2O_3\text{-}0.04Na_2O$.

EXAMPLE 5

Figure 5:
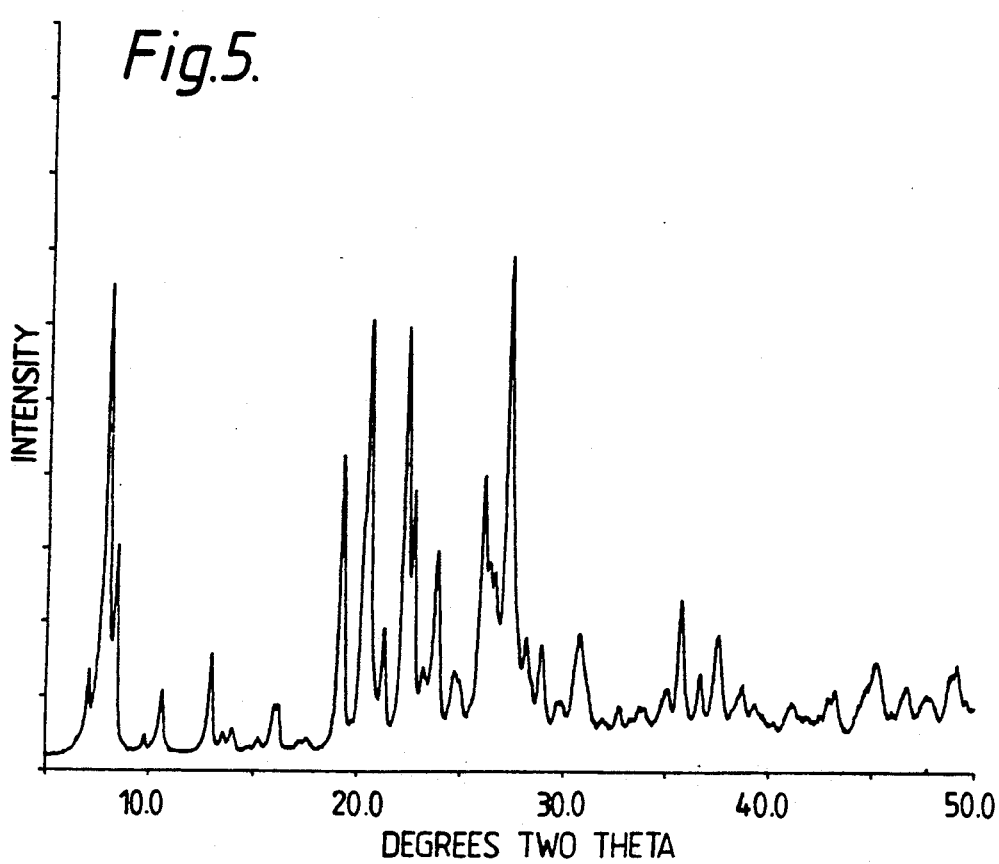
FIG. 5 is the X-ray diffraction pattern for the product of Example 5.

The product from Example 3 was calcined in air for 24 hours at 450° C. followed by 16 hours at 550° C. The resulting material was then ion exchanged, for 4 hours at 60° C. with a 1 molar solution of ammonium chloride using 10 ml of solution per gram of solid calcined product. After ion exchange the material was filtered, washed and dried. This process was repeated. The material was then calcined at 550° C. for 16 hours to generate an H-NU-87 containing approximately 5% of an analcime impurity, as determined by powder X-ray diffraction. The actual X-ray data are given in Table 8 and FIG. 5.

Analysis for Na, Si and Al by AAS revealed the following molar composition:

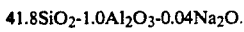
$30.7SiO_2\text{-}1.0Al_2O_3\text{-}0.08Na_2O$.

EXAMPLE 6

Figure 6:
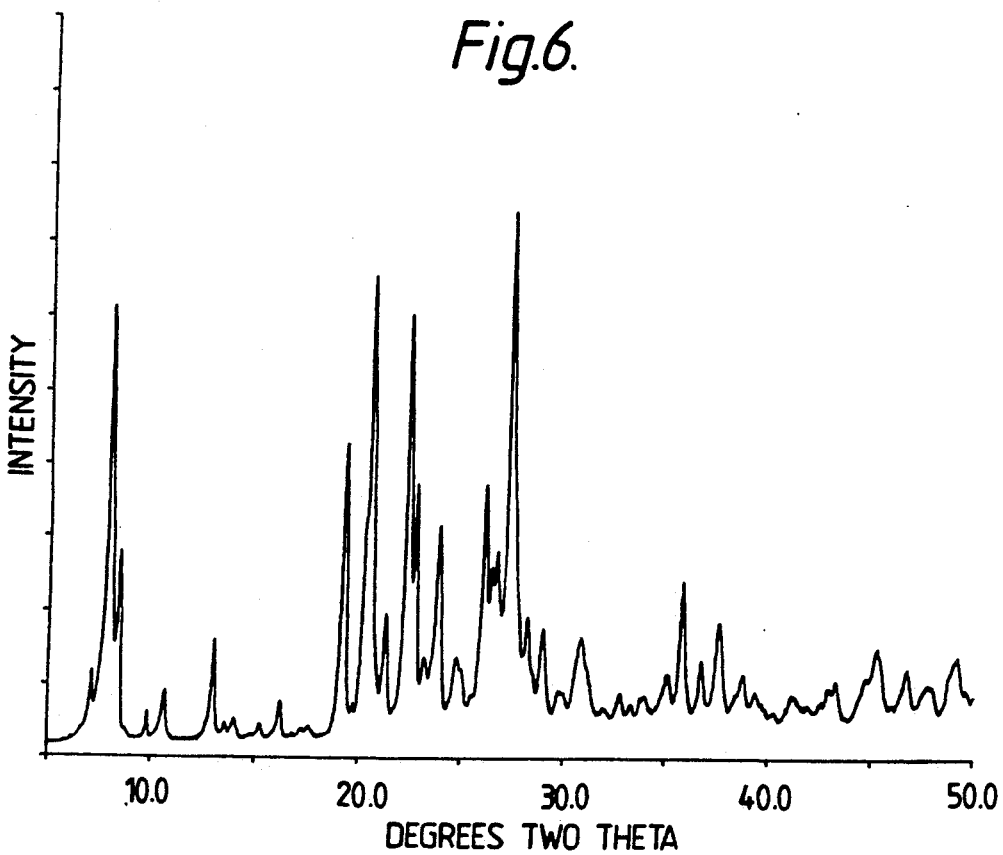
FIG. 6 is the X-ray diffraction pattern for the product of Example 6.

A portion of the product from Example 4 was calcined and ionexchanged by the same technique as in Example 5. After calcination the material was examined by powder X-ray diffraction and found to be highly crystalline sample of H-NU-87 containing no detectable impurities. The actual pattern can be seen in Table 9 and FIG. 6.

Analysis for Na, Si and Al by AAS showed the material to have the following molar composition:

$45.2SiO_2\text{-}1.0Al_2O_3\text{-}0.003Na_2O$.

EXAMPLE 7

Sorption measurements were carried out on a portion of the product for Example 6. The technique was described above and the results can be seen in Table 3.

EXAMPLE 8

A reaction mixture of molar composition:

$60SiO_2\text{-}1.5Al_2O_3\text{-}9Na_2O\text{-}2NaBr\text{-}7.5DecBr_2\text{-}3000H_2O$ was prepared from:
120.2 g "SYTON" X30 (Monsanto:30% Silica sol)
6.118 g "SOAL" 235 (Kaiser Chemicals: molar composition-1.40 $Na_2O\text{-}Al_2O_3\text{-}12.2$ $H_2O$)
5.52 g Sodium Hydroxide (Analar)
31.4 g $DecBr_2$
2.06 g Sodium Bromide
451.9 g Water (deionised).

The molar composition given above does not include sodium present in the "SYTON". The reaction mixture was prepared in a manner similar to Example 1 except that the sodium bromide was added to the sodium hydroxide, "SOAL" 235 and water to form solution A.

The mixture was reacted in a 1 liter stainless steel autoclave at 180° C., with stirring at 300 rpm using a pitched-paddle type agitator.

After 451 hours at reaction temperature the preparation was terminated and crash cooled. The product was discharged, filtered, washed with deionised water and then dried at 110° C.

Figure 7:
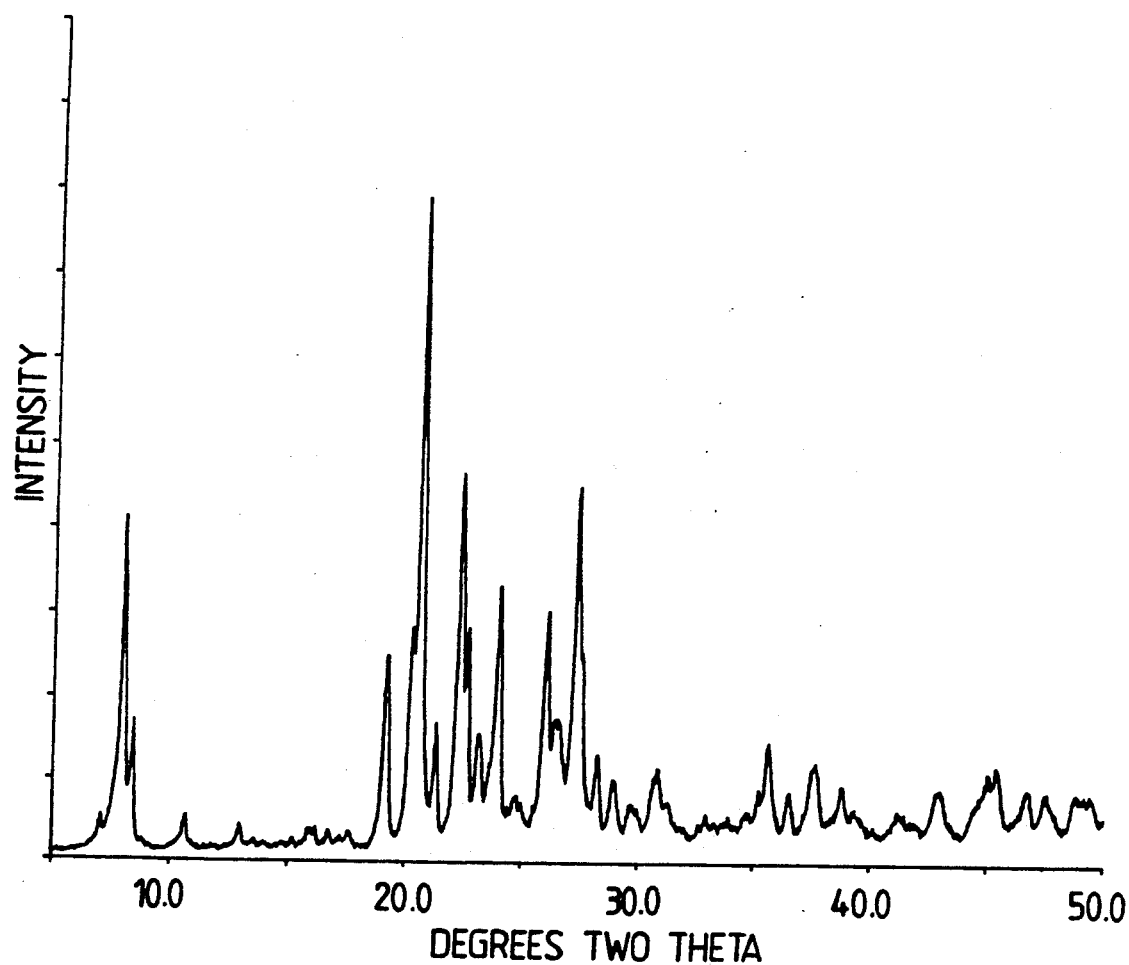
FIG. 7 is the X-ray diffraction pattern for the product of Example 8.

Analysis by powder X-ray diffraction revealed the product to be a substantially pure highly crystalline sample of zeolite NU-87 containing no detectable crystalline impurities. The diffraction pattern is given in FIG. 7 and the interplanar spacings and intensity in Table 10.

Analysis by AAS for Na, Si and Al showed the product to have the following molar composition:

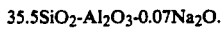
$35.5SiO_2\text{-}Al_2O_3\text{-}0.07Na_2O$.

EXAMPLE 9

A reaction mixture of molar composition:

$60SiO_2\text{-}1.5Al_2O_3\text{-}10Na_2O\text{-}7.5DecBr_2\text{-}3000H_2O$ was prepared from
120.2 g "SYTON" X30 (Monsanto:30% Silica sol)
6.118 g "SOAL" 235 (Kaiser Chemicals: molar composition-1.40 $Na_2O\text{-}Al_2O_3\text{-}12.2$ $H_2O$)
6.32 g Sodium Hydroxide (Analar)
31.4 g $DecBr_2$
451.7 g Water (deionised).

The molar composition given above does not include sodium present in the "SYTON".

The mixture was prepared as follows:
A—solution containing the sodium hydroxide and "SOAL" 235 in 200 g of water.
B—solution containing the $DecBr_2$ in 200 g of water
C—51.7 g of water.

Solution A was added to the "SYTON" X30, with stirring, over a 30 second period. Mixing was continued for 5 minutes then solution B was added, with stirring, over a 30 second period. Finally, the remaining water, C, was added over a 30 second period. The resulting gel was mixed for a further 5 minutes before being transferred to a 1 liter stainless steel autoclave.

The mixture was reacted at 180° C., with stirring at 300 rpm using a pitched-paddle type impeller. Samples were withdrawn at intervals so that progress of the reaction could be monitored. After a total of 359 hours, at reaction temperature, the preparation was crash cooled to ambient temperature and the product discharged, filtered, washed with deionised water and dried at 110° C.

Analysis by X-ray powder diffraction showed the material to be approximately 80% NU-87 with other crystalline impurities.

Examination of the samples withdrawn from the reaction mixture during progress of the reaction by the pH method described in a paper by J L Casci and B M Lowe in Zeolites, 1983, vol 3, page 186 revealed that the main crystallisation event had occurred, by which we mean a major proportion of the reaction mixture i.e. at least 50.5% crystallised, between a reaction time of 308 and 332 hours.

EXAMPLE 10

Example 9 was repeated except that 1.44 g of NU-87 seed was stirred into the gel before it was transferred to the stainless steel autoclave.

The mixture was reacted at 180° C., with stirring at 300 rpm using a pitched-paddle type impeller. Samples were withdrawn at intervals so that progress of the reaction could be monitored.

After a total of 282 hours at reaction temperature the preparation was crash cooled to ambient temperature and the product discharged filtered, washed with deionised water and dried at 110° C.

Analysis for Na, Al and Si by AAS revealed the following molar composition:

$$35.4SiO_2\text{-}1.0Al_2O_3\text{-}0.09Na_2O.$$

Analysis by X-ray powder diffraction showed the material to be a highly crystalline sample of NU-87 containing approximately 5% of a mordenite impurity.

Examination of the samples withdrawn from the reaction mixture during progress of the reaction by the pH method referred to in Example 9 revealed that the main crystallisation event had occurred between a reaction time of 140 and 168 hours.

A comparison of Examples 9 and 10 demonstrates that the use of a seed crystal:
(a) reduces the total reaction time required to prepare zeolite NU-87 and
(b) increases the purity of NU-87 resulting from a particular reaction mixture.

EXAMPLE 11

The product from Example 10 was calcined in air for 24 hours at 450° C. followed by 16 hours at 550° C. The resulting material was then ion exchanged for 4 hours at 60° C. with a 1 molar solution of ammonium chloride, using 10 ml of solution per gram of solid calcined product. After ion exchange the material was filtered, washed and dried. After two such treatments the resulting NH$_4$-NU-87 material was calcined at 550° C. for 16 hours to generate an H-NU-87.

Analysis for Na, Al, and Si by AAS revealed the following molar composition:

$$39.0SiO_2\text{-}1.0Al_2O_3\text{-less than }0.002Na_2O.$$

EXAMPLE 12

A reaction mixture of molar composition:

$$60SiO_2\text{-}1.5Al_2O_3\text{-}9Na_2O\text{-}7.5DecBr_2\text{-}2NaBr\text{-}3000H_2O$$

was prepared from:
300.4 g "SYTON" X30 (Monsanto; 30% silica sol)
15.29 g "SOAL" 235 (Kaiser Chemicals; molar composition 1.40 Na$_2$O-Al$_2$O$_3$-12.2 H$_2$O)
13.79 g Sodium Hydroxide (Analar)
78.4 g Decamethonium Bromide (Fluka)
5.15 g Sodium Bromide
1129.6 g Water (deionised).

The molar composition given above does not include sodium present in the "SYTON".

The mixture was prepared as follows:
A—solution containing the sodium hydroxide and "SOAL" 235 in 500 g of water
B—solution containing the DecBr$_2$ in 500 g of water
C—129.6 g of water.

The reaction mixture was prepared in a manner similar to Example 1.

The mixture was reacted in a 2 liter stainless steel autoclave at 180° C., with stirring at 300 rpm using two agitators. The lower part of the mixture was stirred using a pitched paddle type agitator whereas the upper part of the mixture was stirred using a 6 blade turbine type agitator.

After 408 hours at reaction temperature the preparation was terminated by crash cooling. The product was discharged, filtered, washed with deionised water and then dried at 110° C.

Analysis by powder X-ray diffraction showed the material to be a highly crystalline sample of zeolite NU-87 containing no detectable crystalline impurities.

EXAMPLE 13

A portion of the material from Example 12 was calcined in air at 450° C. for 24 hours followed by 16 hours at 550° C. The material was then ion-exchanged for 4 hours with a 1 molar solution of ammonium chloride, at 60° C. using 10 ml of solution per gram of solid calcined product. The material was then filtered, washed with deionised water and dried at 110° C. After two such exchanges the resulting NH$_4$-NU87 was calcined at 550° C. for 16 hours to generate the hydrogen form, that is, H-NU-87. Analysis by AAS for Si, Al and Na gave the following molar composition.

$$37.9SiO_2\text{-}1.0Al_2O_3\text{-less than }0.002Na_2O.$$

EXAMPLE 14

A reaction mixture of molar composition $$60SiO_2\text{-}1.5Al_2O_3\text{-}9Na_2O\text{-}7.5DecBr_2\text{-}2NaBr\text{-}3000H_2O$$

was prepared from
2.403 kg "SYTON" X30 (Monsanto; 30% silica sol)
0.1224 kg "SOAL" 235 (Kaiser Chemicals; molar composition 1.40 Na$_2$O-Al$_2$O$_3$-12.2 H$_2$O)
0.1103 kg Sodium Hydroxide (Analar)
0.6275 kg Decamethonium Bromide
0.0412 kg Sodium Bromide 0.0288 kg NU-87 seed crystals, the product from Example 12
9.0363 kg Water.

The molar composition given above does not include the seed crystals or sodium present in the "SYTON".
The mixture was prepared as follows:
A—solution containing the sodium hydroxide, sodium bromide and "SOAL" 235 in about one third of the total water
B—solution containing the DecBr$_2$ in about one third of the total water.
C—remaining water.

The seed crystals were ground to a fine powder and then stirred into the "SYTON" X30. The mixture was transferred to a 19 liter stainless steel autoclave. The mixture was stirred at ambient temperature and a small amount of solution C added. To this mixture solution A was added followed by a small amount of solution C. Solution B was then added followed by the remainder of solution C. The autoclave was sealed and the mixture reacted at 180° C. with stirring and agitation.

After a total of 257 hours at reaction temperature the preparation was terminated, crash cooled and discharged. The product was separated by filtration, washed with water and dried at 110° C.

Analysis by powder X-ray diffraction revealed the product to be a highly crystalline sample of zeolite NU-87 containing approximately 5% of a crystalline impurity.

EXAMPLE 15

A portion of the product from Example 14 was calcined, in air, at 450° C. for 24 hours followed by 16 hours at 550° C. The resulting material was then contacted for 4 hours at 60° C. with a 1 molar solution of ammonium chloride, using 10 ml of solution per gram of solid calcined product. After ion exchange the material was filtered, washed with deionised water and then dried at 110° C. After two such treatments the resulting NH$_4$-NU-87 was calcined at 550° C. for 16 hours to generate H-NU-87.

Analysis for Na, Al and Si by AAS gave the following molar composition:

37SiO$_2$-Al$_2$O$_3$-0.004Na$_2$O.

EXAMPLE 16

The procedure of Example 15 was repeated using a fresh portion of the product from Example 14.

Analysis, by AAS, for Na, Si and Al gave the following molar composition:

37.0SiO$_2$-Al$_2$O$_3$-0.002Na$_2$O.

EXAMPLE 17

This Example illustrates the use of dodecamethonium bromide (DodecBr$_2$)

[(CH$_3$)$_3$N(CH$_2$)$_{12}$N(CH$_3$)$_3$]Br$_2$ in the formation of zeolite NU-87.

A reaction mixture of molar composition:

60SiO$_2$-2Al$_2$O$_3$-10Na$_2$O-10DodecBr$_2$-3000H$_2$O was prepared from 79.9 g "SYTON" X30 (Monsanto; 30% silica sol)
3.46 g Sodium Aluminate (BDH Ltd; molar composition 1.21 Na$_2$O-Al$_2$O$_3$-4.57 H$_2$O)
3.7 g Sodium Hydroxide
29.7 g DodecBr$_2$
303.5 g Water (deionised).

The mixture was prepared as follows;
A—solution containing "SYTON" X30, and sodium hydroxide in about 55% of the required water.
B—solution containing sodium aluminate, sodium hydroxide and the remaining water.

Solutions A and B were mixed, with agitation, and then transferred to a 1 liter stainless steel autoclave. The mixture was reacted at 180° C. with stirring at 500 rpm using a pitched paddle type impeller. After 13 days the reaction was terminated. The product discharged, filtered, washed with deionised water and dried at 110° C.

Analysis by X-ray powder diffraction showed the material to be mainly zeolite NU-87 although it was contaminated with minor amounts of other crystalline phases.

Analysis by AAS for Si, Al and Na, gave the following molar composition:

29SiO$_2$-Al$_2$O$_3$-0.18Na$_2$O.

EXAMPLE 18

This example illustrates the use of octamethonium bromide (OctaBr$_2$)

[(CH$_3$)$_3$N(CH$_2$)$_8$N(CH$_3$)$_3$]Br$_2$ in the formation of NU-87.

A reaction mixture of molar composition

60SiO$_2$-1.5Al$_2$O$_3$-9.1Na$_2$O-7.5OctaBr$_2$-2NaBr-3000H$_2$O was prepared from
120.2 g "SYTON" X30 (Monsanto; Colloidal silica)
6.679 g "SOAL" 235 (Kaiser Chemicals; molar composition-1.40 Na$_2$O-Al$_2$O$_3$-14.25 H$_2$O)
5.63 g Sodium Hydroxide
60.6 g Octamethoinum Bromide solution (48.3% w/w in water)
2.06 g Sodium Bromide
420.0 g Water (deionised)
1.44 g NU-87 seed crystals—product from Example 14.

The molar composition given above does not include sodium present in the 'SYTON' X30. It also ignores the present of the NU-87 seed crystals.

The mixture was prepared in a manner similar to that described in Example 1 except that the sodium bromide was dissolved in solution A and the seed material was stirred into the final gel which was then transferred to a 1 liter stainless steel autoclave. The mixture was reacted at 180° C., with stirring at 300 rpm using a pitched paddle type impeller.

After 166 hours at reaction temperature the preparation was terminated by crash cooling. The product was discharged, filtered, washed with de-ionised water and then dried at 110° C.

Analysis of the product by powder X-ray diffraction showed the material to be a highly crystalline sample of zeolite NU-87 containing no detectable crystalline impurities. The relatively broad X-ray lines of the product compared to those of the material from Example 1 suggests that the product from this Example has small crystals.

EXAMPLE 19

A reaction mixture similar to that described in Example 18 was prepared. However, in this preparation no zeolite NU-87 seed crystals were added and the reaction mixture contained 9.0 moles $Na_2O$ rather than 9.1 moles $Na_2O$ as used in Example 18. The mixture was prepared and reacted as in Example 18. After 266 hours at 180° C., the reaction was terminated by crash cooling.

The product was isolated by filtration, washed and then dried as described in Example 18. Analysis of the product by X-ray powder diffraction showed the material to be highly crystalline with the major crystalline phase being zeolite ZSM-23. There was no evidence for the presence of any zeolite NU-87.

EXAMPLE 20

H-NU-87 (the product of Example 16) was pelleted, broken down and sieved to give aggregates of between 500–1000 microns. Portions of this material were then contacted with solutions containing ethanol in water, at room temperature, using approximately 1 gram of zeolite per 10 grams of solution. The mixtures were shaken occasionally. After about 65 hours a sample of the liquor was removed and analyzed by gas chromatography. Comparison, before and after treatment, gave the following results.

| Ex | Ethanol Conc % (w/w) Before contact | After contact | % Removed |
|---|---|---|---|
| 20a | 1.2 | 0.8 | 33.3 |
| 20b | 0.1 | 0.04 | 60.0 |

It can be seen that up to 60% of the ethanol was removed even when the starting concentration was only 1000 ppm. Thus NU-87 may be effective in the removal of organic compounds from aqueous solutions.

TABLE 4

X-RAY DATA FOR THE PRODUCT OF EXAMPLE 1

| d (Angstroms) | Relative Intensity (I/Io) |
|---|---|
| 12.53 | 7 |
| 11.11 | 53 |
| 10.56 | 23 |
| 9.01 | 3 |
| 8.34 | 7 |
| 6.83 | 5 |
| 6.54 | 4 |
| 5.56 | 4 |
| 5.47 | 5 |
| 5.30 | 4 |
| 5.15 | 3 |
| 5.02 | 3 |
| 4.62 | 42 |
| 4.52 | 7 |
| 4.40 | 38 |
| 4.32 | 100 |
| 4.17 | 22 |
| 3.99 | 78 |
| 3.93 | 43 |
| 3.85 | 21 |
| 3.84 | 20 |
| 3.71 | 40 |
| 3.60 | 10 |
| 3.44 | 36 |
| 3.42 | 40 |
| 3.38 | 25 |
| 3.35 | 22 |
| 3.27 | 58 |
| 3.24 | 34 |
| 3.16 | 15 |
| 3.08 | 11 |
| 3.01 | 6 |
| 2.90 | 13 |
| 2.86 | 7 |
| 2.74 | 3 |
| 2.72 | 4 |
| 2.69 | 3 |
| 2.64 | 3 |
| 2.59 | 4 |
| 2.55 | 8 |
| 2.52 | 21 |
| 2.46 | 9 |
| 2.45 | 8 |
| 2.40 | 13 |
| 2.39 | 12 |
| 2.32 | 9 |
| 2.29 | 5 |
| 2.19 | 4 |
| 2.11 | 8 |
| 2.10 | 8 |
| 2.04 | 5 |
| 2.01 | 12 |
| 1.99 | 12 |

TABLE 5

X-RAY DATA FOR THE PRODUCT OF EXAMPLE 2

| d (Angstroms) | Relative Intensity (I/Io) |
|---|---|
| 12.40 | 14 |
| 11.06 | 100 |
| 10.47 | 41 |
| 9.94 | 4 |
| 9.00 | 7 |
| 8.30 | 12 |
| 6.79 | 19 |
| 6.51 | 4 |
| 6.31 | 6 |
| 5.44 | 8 |
| 4.59 | 56 |
| 4.49 | 8 |
| 4.38 | 36 |
| 4.31 | 89 |
| 4.16 | 23 |
| 3.97 | 87 |
| 3.90 | 48 |
| 3.84 | 23 |
| 3.73 | 37 |
| 3.71 | 42 |
| 3.60 | 13 |
| 3.55 | 11 |
| 3.41 | 46 |
| 3.37 | 33 |
| 3.33 | 32 |
| 3.26 | 93 |
| 3.23 | 43 |
| 3.16 | 20 |
| 3.08 | 18 |
| 3.00 | 7 |
| 2.98 | 8 |
| 2.89 | 17 |
| 2.79 | 3 |
| 2.73 | 7 |
| 2.68 | 3 |
| 2.65 | 5 |
| 2.64 | 5 |
| 2.55 | 10 |
| 2.51 | 24 |
| 2.45 | 11 |
| 2.39 | 19 |
| 2.38 | 16 |
| 2.32 | 10 |
| 2.29 | 5 |
| 2.20 | 4 |
| 2.11 | 5 |
| 2.09 | 7 |
| 2.03 | 7 |

TABLE 5-continued
X-RAY DATA FOR THE PRODUCT OF EXAMPLE 2

| d (Angstroms) | Relative Intensity (I/Io) |
|---|---|
| 2.01 | 13 |
| 2.00 | 13 |

TABLE 6
X-RAY DATA FOR THE PRODUCT OF EXAMPLE 3

| d (Angstroms) | Relative Intensity (I/Io) |
|---|---|
| 12.62 | 8 |
| 11.14 | 51 |
| 10.59 | 23 |
| 8.35 | 7 |
| 6.84 | 4 |
| 6.54 | 3 |
| 5.57 | 13 |
| 5.48 | 5 |
| 5.29 | 4 |
| 5.03 | 4 |
| 4.63 | 42 |
| 4.40 | 39 |
| 4.32 | 100 |
| 4.17 | 22 |
| 3.99 | 78 |
| 3.93 | 47 |
| 3.84 | 17 |
| 3.71 | 37 |
| 3.60 | 13 |
| 3.45 | 31 |
| 3.42 | 55 |
| 3.38 | 32 |
| 3.35 | 26 |
| 3.27 | 63 |
| 3.24 | 36 |
| 3.15 | 18 |
| 3.09 | 14 |
| 3.01 | 9 |
| 2.91 | 24 |
| 2.86 | 9 |
| 2.81 | 6 |
| 2.72 | 7 |
| 2.68 | 8 |
| 2.59 | 8 |
| 2.52 | 24 |
| 2.46 | 13 |
| 2.40 | 17 |
| 2.38 | 14 |
| 2.32 | 13 |
| 2.29 | 13 |
| 2.28 | 6 |
| 2.21 | 7 |
| 2.19 | 9 |
| 2.16 | 7 |
| 2.10 | 15 |
| 2.04 | 11 |
| 2.01 | 16 |

TABLE 7
X-RAY DATA FOR THE PRODUCT OF EXAMPLE 4

| d (Angstroms) | Relative Intensity (I/Io) |
|---|---|
| 12.52 | 6 |
| 11.06 | 49 |
| 10.50 | 21 |
| 8.97 | 5 |
| 8.31 | 6 |
| 6.81 | 4 |
| 6.51 | 3 |
| 5.54 | 5 |
| 5.46 | 4 |
| 5.29 | 4 |
| 5.01 | 3 |
| 4.62 | 35 |
| 4.50 | 6 |
| 4.39 | 37 |
| 4.31 | 100 |
| 4.16 | 21 |
| 3.98 | 69 |

TABLE 7-continued
X-RAY DATA FOR THE PRODUCT OF EXAMPLE 4

| d (Angstroms) | Relative Intensity (I/Io) |
|---|---|
| 3.92 | 43 |
| 3.83 | 17 |
| 3.70 | 40 |
| 3.61 | 11 |
| 3.44 | 22 |
| 3.4 | 41 |
| 3.37 | 30 |
| 3.35 | 24 |
| 3.27 | 60 |
| 3.23 | 33 |
| 3.15 | 18 |
| 3.09 | 12 |
| 3.08 | 13 |
| 3.01 | 8 |
| 2.97 | 6 |
| 2.92 | 12 |
| 2.89 | 15 |
| 2.85 | 9 |
| 2.81 | 5 |
| 2.71 | 6 |
| 2.68 | 5 |
| 2.66 | 5 |
| 2.63 | 5 |
| 2.59 | 7 |
| 2.54 | 11 |
| 2.52 | 21 |
| 2.46 | 12 |
| 2.40 | 15 |
| 2.38 | 13 |
| 2.32 | 11 |
| 2.29 | 8 |
| 2.24 | 4 |
| 2.19 | 7 |
| 2.15 | 6 |
| 2.10 | 13 |
| 2.03 | 10 |
| 2.01 | 13 |

TABLE 8
X-RAY DATA FOR THE PRODUCT OF EXAMPLE 5

| d (Angstroms) | Relative Intensity (I/Io) |
|---|---|
| 12.41 | 17 |
| 11.10 | 96 |
| 10.48 | 42 |
| 8.99 | 4 |
| 8.31 | 13 |
| 6.79 | 21 |
| 6.51 | 4 |
| 6.33 | 5 |
| 5.53 | 10 |
| 5.45 | 10 |
| 4.60 | 61 |
| 4.50 | 7 |
| 4.38 | 43 |
| 4.32 | 88 |
| 4.16 | 26 |
| 3.98 | 87 |
| 3.91 | 52 |
| 3.83 | 17 |
| 3.72 | 42 |
| 3.60 | 17 |
| 3.56 | 14 |
| 3.41 | 57 |
| 3.37 | 40 |
| 3.34 | 38 |
| 3.26 | 100 |
| 3.16 | 24 |
| 3.08 | 22 |
| 3.07 | 20 |
| 3.00 | 11 |
| 2.98 | 11 |
| 2.92 | 17 |
| 2.90 | 25 |
| 2.80 | 7 |
| 2.73 | 10 |
| 2.65 | 9 |
| 2.63 | 10 |

TABLE 8-continued
X-RAY DATA FOR THE PRODUCT OF EXAMPLE 5

| d (Angstroms) | Relative Intensity (I/Io) |
|---|---|
| 2.55 | 14 |
| 2.51 | 31 |
| 2.45 | 17 |
| 2.39 | 24 |
| 2.32 | 14 |
| 2.29 | 11 |
| 2.24 | 7 |
| 2.20 | 10 |
| 2.15 | 8 |
| 2.11 | 11 |
| 2.09 | 13 |
| 2.03 | 13 |
| 2.00 | 18 |

TABLE 9
X-RAY DATA FOR THE PRODUCT OF EXAMPLE 6

| d (Angstroms) | Relative Intensity (I/Io) |
|---|---|
| 12.44 | 14 |
| 11.12 | 84 |
| 10.52 | 37 |
| 9.01 | 6 |
| 8.33 | 10 |
| 6.81 | 19 |
| 6.53 | 4 |
| 6.32 | 4 |
| 5.81 | 3 |
| 5.45 | 8 |
| 4.60 | 56 |
| 4.39 | 39 |
| 4.32 | 89 |
| 4.17 | 25 |
| 3.98 | 82 |
| 3.91 | 49 |
| 3.84 | 16 |
| 3.73 | 41 |
| 3.60 | 16 |
| 3.56 | 14 |
| 3.41 | 49 |
| 3.37 | 33 |
| 3.34 | 36 |
| 3.26 | 100 |
| 3.16 | 24 |
| 3.08 | 22 |
| 3.01 | 10 |
| 2.98 | 9 |
| 2.90 | 20 |
| 2.86 | 12 |
| 2.80 | 7 |
| 2.73 | 9 |
| 2.69 | 7 |
| 2.65 | 8 |
| 2.63 | 9 |
| 2.55 | 13 |
| 2.51 | 30 |
| 2.45 | 16 |
| 2.39 | 23 |
| 2.32 | 13 |
| 2.29 | 10 |
| 2.24 | 6 |
| 2.20 | 9 |
| 2.16 | 7 |
| 2.13 | 8 |
| 2.11 | 11 |
| 2.09 | 12 |
| 2.03 | 12 |
| 2.01 | 18 |
| 2.00 | 16 |

TABLE 10
X-RAY DATA FOR THE PRODUCT OF EXAMPLE 8

| d (Angstroms) | Relative Intensity (I/Io) |
|---|---|
| 12.46 | 6 |
| 11.05 | 53 |
| 10.50 | 20 |
| 8.29 | 6 |
| 6.82 | 4 |
| 5.58 | 3 |
| 5.47 | 4 |
| 5.28 | 3 |
| 5.02 | 3 |
| 4.62 | 31 |
| 4.39 | 35 |
| 4.31 | 100 |
| 4.16 | 20 |
| 3.98 | 60 |
| 3.92 | 35 |
| 3.85 | 20 |
| 3.82 | 16 |
| 3.71 | 43 |
| 3.59 | 9 |
| 3.49 | 7 |
| 3.42 | 38 |
| 3.38 | 21 |
| 3.34 | 20 |
| 3.26 | 57 |
| 3.23 | 30 |
| 3.16 | 16 |
| 3.15 | 14 |
| 3.09 | 12 |
| 3.07 | 11 |
| 3.01 | 7 |
| 2.98 | 7 |
| 2.91 | 12 |
| 2.90 | 14 |
| 2.86 | 8 |
| 2.71 | 6 |
| 2.68 | 5 |
| 2.64 | 5 |
| 2.59 | 6 |
| 2.54 | 10 |
| 2.52 | 16 |
| 2.46 | 10 |
| 2.40 | 14 |
| 2.38 | 14 |
| 2.32 | 11 |
| 2.29 | 7 |
| 2.24 | 4 |
| 2.19 | 7 |
| 2.16 | 5 |
| 2.10 | 10 |
| 2.07 | 4 |
| 2.04 | 7 |
| 2.01 | 12 |
| 2.00 | 14 |
| 1.99 | 11 |

We claim:

1. A zeolite, designated NU-87, having a composition expressed on an anhydrous basis (in terms of mole ratios of oxide) by the formula: 100 $XO_2$: equal to or less than 10 $Y_2O_3$: equal to or less than 20 $R_{2/n}O$ where R is one or more cations of valency n, X is silicon and/or germanium, Y is one or more of aluminum, iron, gallium, boron, titanium, vanadium, zirconium, molybdenum, arsenic, antimony, chromium and manganese and having an X-ray diffraction pattern including the lines shown in Table 1 below:

TABLE 1

| d (Angstroms) | Relative Intensity |
|---|---|
| 12.52 ± 0.15 | w |
| 11.06 ± 0.15 | s |
| 10.50 ± 0.15 | m |
| 8.31 ± 0.15 | w |
| 6.81 ± 0.12 | w |
| 4.62 ± 0.10 | m–s |
| 4.39 (Sh) ± 0.10 | m–s |
| 4.31 ± 0.10 | vs |
| 4.16 ± 0.10 | m |

TABLE 1-continued

| d (Angstroms) | Relative Intensity |
|---|---|
| 3.98 ± 0.08 | s-vs |
| 3.92 (Sh) ± 0.08 | s |
| 3.83 ± 0.08 | w-m |
| 3.70 ± 0.07 | m-s |
| 3.61 ± 0.07 | w |
| 3.41 ± 0.07 | m-s |
| 3.37 (Sh) ± 0.07 | m |
| 3.26 ± 0.06 | s-vs |
| 3.15 ± 0.06 | w |
| 3.08 ± 0.06 | w |
| 2.89 ± 0.05 | w-m |
| 2.52 ± 0.04 | w-m, | where (Sh)=a shoulder on a more intense peak, w=less than 20, m=between 20 and 40, s=greater than 40 but less than 60, and vs=greater than 60.

2. A zeolite as claimed in claim 1 having an X-ray diffraction pattern substantially as shown in Table 10 of the specification.

3. A zeolite as claimed in claim 1 wherein the composition is expressed by the formula: 100 $XO_2$: equal to or less than 4 $Y_2O_3$: equal to or less than 8.0 $R_{2/n}O$.

4. An as-prepared zeolite as claimed in claim 1 and having a composition expressed on an anhydrous basis (in terms of mole ratios of oxide) by the formula:
100 $XO_2$: less than or equal to 10 $Y_2O_3$: less than or equal to 10 Q: less than or equal to 10 $M_2O$
wherein Q is a polymethylene alpha, omega-diammonium cation having the formula:

$$[(R_1R_2R_3)N(CH_2)_mN(R_4R_5R_6)]^{2+}$$

where $R_1$, $R_2$, $R_3$, $R_4$, $R_5$ and $R_6$ are each methyl and m is in the range 8 to 14 and M is an alkali metal and/or ammonium.

5. A zeolite as claimed in claim 1 where X is silicon and Y is aluminium.

6. A zeolite as claimed in claim 1 in its hydrogen, ammonium or metal-containing forms.

7. A zeolite as claimed in claim 1, where R is or includes hydrogen, having a sorptive capacity for cyclohexane of at least 10% by weight at a relative pressure of 0.5.

8. A method for preparing zeolite NU-87 as defined in claim 1 which comprises reacting an aqueous mixture comprising a source of at least one oxide $XO_2$, where X is silicon and/or germanium, at least one nitrogen-containing organic cation Q, where Q is a polymethylene alpha, omega-diammonium cation having the formula:

$$[(R_1R_2R_3)N(CH_2)_mN(R_4R_5R_6)]^{2+}$$

or a precursor thereof, where $R_1$, $R_2$, $R_3$, $R_4$, $R_5$ and $R_6$ are each methyl and m is within the range 9 to 14, optionally a source of at least one oxide $Y_2O_3$, where Y is one or more of aluminum, iron, gallium, boron, titanium, vanadium, zirconium, molybdenum, arsenic, antimony, chromium and manganese, and optionally a source of monovalent cations, the mixture having the molar composition
$XO_2/Y_2O_3$ at least 10
$(R_{1/n})OH/XO_2$ in the range 0.01 to 2
$H_2O/XO_2$ in the range 1 to 500
$Q/XO_2$ in the range 0.005 to 1
$L_pZ/XO_2$ in the range 0 to 5
where R is a cation of valency n which can include Q and/or M, where M is an alkali metal cation and/or ammonium, and Z is an anion of valency p and L is an alkali metal and/or an ammonium ion, and continuing the reaction until the product contains a major proportion of NU-87.

9. A method as claimed in claim 8 wherein the reaction mixture further comprises a seed material.

10. A method for the preparation of the hydrogen form of zeolite Nu-87 comprising
 (i) optionally calcining as-prepared zeolite NU-87; and
 (ii) ion exchanging with an acid or with a solution of an ammonium salt.

11. A method for preparing zeolite NU-87 as defined in claim 1 which comprises reacting an aqueous mixture comprising a source of at least one oxide $XO_2$, where X is silicon and/or germanium, at least one nitrogen-containing organic cation Q, where Q is a polymethylene alpha, omega-diammonium cation having the formula:

$$[(R_1R_2R_3)N(CH_2)_mN(R_4R_5R_6)]^{2+}$$

or a precursor thereof, where $R_1$, $R_2$, $R_3$, $R_4$, $R_5$ and $R_6$ are each $C_1$ alkyl and m is within the range 10 to 12, optionally a source of at least one oxide $Y_2O_3$, where Y is one or more of aluminium, iron, gallium, boron, titanium, vanadium, zirconium, molybdenum, arsenic, antimony, chromium and manganese, and optionally a source of monovalent cations, the mixture having the molar composition
$XO_2/Y_2O_3$ at least 10
$(R_{1/n})OH/XO_2$ in the range 0.01 to 2
$H_2O/XO_2$ in the range 1 to 500
$Q/XO_2$ in the range 0.005 to 1
$L_pZ/XO_2$ in the range 0 to 5
where R is a cation of valency n which can include Q and/or M, where M is an alkali metal cation and/or ammonium, and Z is an anion of valency p and L is an alkali metal and/or an ammonium ion, and continuing the reaction until the product contains a major proportion of NU-87.

12. A method for preparing zeolite NU-87 as defined in claim 1 which comprises reacting an aqueous mixture comprising a source of at least one oxide $XO_2$, where X is silicon and/or germanium, at least one nitrogen-containing organic cation Q, where Q is a polymethylene alpha, omega-diammonium cation having the formula:

$$[(R_1R_2R_3)N(CH_2)_mN(R_4R_5R_6)]^{2+}$$

or a precursor thereof, where $R_1$, $R_2$, $R_3$, $R_4$, $R_5$ and $R_6$ are each $C_1$ alkyl and m is 8, a source of at least one oxide $Y_2O_3$, where Y is aluminium and/or iron, gallium, boron, titanium, vanadium, zirconium, molybdenum, arsenic, antimony, chromium and manganese, and optionally a source of monovalent cations, the mixture having the molar composition
$XO_2/Y_2O_3$ at least 10
$(R_{1/n})OH/XO_2$ in the range 0.01 to 2
$H_2O/XO_2$ in the range 1 to 500
$Q/XO_2$ in the range 0.005 to 1
$L_pZ/XO_2$ in the range 0 to 5
where R is a cation of valency n which can include Q and/or M, where M is an alkali metal cation and/or ammonium, and Z is an anion of valency p and L is an alkali metal and/or an ammonium ion, and continuing the reaction until the product contains a major proportion of NU-87.

13. A method for preparing zeolite NU-87 as defined in claim 1 which comprises reacting an aqueous mixture comprising a source of at least one oxide $XO_2$, where X is silicon and/or germanium, at least one nitrogen-containing organic cation Q, where Q is a polymethylene alpha, omega-diammonium cation having the formula:

$$[(R_1R_2R_3)N(CH_2)_mN(R_4{}_5R_6)]^{2+}$$

or a precursor thereof, where $R_1$, $R_2$, $R_3$, $R_4$, $R_5$ and $R_6$ are each $C_1$ alkyl and m is 8, a source of at least one oxide $Y_2O_3$, where Y is aluminium and/or gallium, and optionally a source of monovalent cations, the mixture having the molar composition $XO_2/Y_2O_3$ at least 10
$(R_{1/n})OH/XO_2$ in the range 0.01 to 2
$H_2O/XO_2$ in the range 1 to 500
$Q/XO_2$ in the range 0.005 to 1
$L_pZ/XO_2$ in the range 0 to 5 where R is a cation of valency n which can include Q and/or M, where M is an alkali metal cation and/or ammonium, and Z is an anion of valency p and L is an alkali metal and/or an ammonium ion, and continuing the reaction until the product contains a major proportion of NU-87.

14. A method for preparing zeolite NU-87 as defined in claim 1 which comprises reacting an aqueous mixture comprising a source of at least one oxide $XO_2$, where X is silicon and/or germanium, at least one nitrogen-containing organic cation Q, where Q is a polymethylene alpha, omega-diammonium cation having the formula:

$$[(R_1R_2R_3)N(CH_2)_mN\ (R_4R_5R_6)]^{2+}$$

or a precursor thereof, where $R_1$, $R_2$, $R_3$, $R_4$, $R_5$ and $R_6$ are each $C_1$ alkyl and m is 8, a seed material, optionally a source of at least one oxide $Y_2O_3$, where Y is one or more of aluminium, iron, gallium, boron, titanium, vanadium, zirconium, molybdenum, arsenic, antimony, chromium and manganese, and optionally a source of monovalent cations, the mixture having the molar composition $XO_2/Y_2O_3$ at least 10
$(R_{1/n})OH/XO_2$ in the range 0.01 to 2
$H_2O/XO_2$ in the range 1 to 500
$Q/XO_2$ in the range 0.005 to 1
$L_pZ/XO_2$ in the range 0 to 5 where R is a cation of valency n which can include Q and/or M, where M is an alkali metal cation and/or ammonium, and Z is an anion of valency p and L is an alkali metal and/or an ammonium ion, and continuing the reaction until the product contains a major proportion of NU-87.

15. A method for preparing zeolite NU-87 as defined in claim 1 which comprises reacting an aqueous mixture comprising a source of at least one oxide $XO_2$, where X is silicon and/or germanium, at least one nitrogen-containing organic cation Q, where Q is a polymethylene alpha, omega-diammonium cation having the formula:

$$[(R_1R_2R_3)N(CH_2)_mN\ (R_4R_5R_6)]^{2+}$$

or a precursor thereof, where $R_1$, $R_2$, $R_3$, $R_4$, $R_5$ and $R_6$ are each $C_1$ alkyl and m is 8, a seed material comprising zeolite NU-87, optionally a source of at least one oxide $Y_2O_3$, where Y is one or more of aluminium, iron, gallium, boron, titanium, vanadium, zirconium, molybdenum, arsenic, antimony, chromium and manganese, and optionally a source of monovalent cations, the mixture having the molar composition $XO_2/Y_2O_3$ at least 10
$(R_{1/n})OH/XO_2$ in the range 0.01 to 2
$H_2O/XO_2$ in the range 1 to 500
$Q/XO_2$ in the range 0.005 to 1
$L_pZ/XO_2$ in the range 0 to 5 where R is a cation of valency n which can include Q and/or M, where M is an alkali metal cation and/or ammonium, and Z is an anion of valency p and L is an alkali metal and/or an ammonium ion, and continuing the reaction until the product contains a major proportion of NU-87.

* * * * *